United States Patent
Boehler

(10) Patent No.: US 12,476,949 B2
(45) Date of Patent: Nov. 18, 2025

(54) PRIVACY-PRESERVING DEMAND ESTIMATION ACROSS COMPANIES

(71) Applicant: SAP SE, Walldorf (DE)

(72) Inventor: Jonas Boehler, Karlsruhe (DE)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 18/055,110

(22) Filed: Nov. 14, 2022

(65) Prior Publication Data

US 2024/0163268 A1    May 16, 2024

(51) Int. Cl.
*H04L 9/40* (2022.01)

(52) U.S. Cl.
CPC ........ *H04L 63/062* (2013.01); *H04L 63/0435* (2013.01)

(58) Field of Classification Search
None
See application file for complete search history.

(56) References Cited

U.S. PATENT DOCUMENTS

| | | | |
|---|---|---|---|
| 2020/0021568 A1* | 1/2020 | Becher | H04L 9/083 |
| 2022/0094519 A1* | 3/2022 | Jeljeli | H04L 9/088 |
| 2023/0053566 A1* | 2/2023 | Horne | G06F 21/6227 |

OTHER PUBLICATIONS

Ban, G.-Y. et al., "The Big Data Newsvendor: Practical Insights from Machine Learning." Operations Research 67.1 (2019): 90-108.

* cited by examiner

*Primary Examiner* — Syed A Roni
(74) *Attorney, Agent, or Firm* — Mintz Levin Cohn Ferris Glovsky and Popeo, P.C.

(57) ABSTRACT

Aspects of the current subject matter are directed to privacy-preserving demand estimation. According to an aspect, a method includes receiving, by a first party, a request to provide a projection; receiving, by the first party, a key; in response to the request, performing, by the first party, a partial projection using private data of the first party without sharing the private data with at least one other party; encrypting, by the first party, the partial projection using the key; sending, by the first party, the encrypted partial projection to an aggregator; combining, by the aggregator, the encrypted partial projection provided by the first party with at least one other encrypted partial projection provided by the at least one other party to generate an encrypted combined projection. Related systems, methods, and articles of manufacture are also disclosed.

16 Claims, 8 Drawing Sheets

PRIVACY-PRESERVING DEMAND ESTIMATION ACROSS COMPANIES

FIELD

The present disclosure generally relates to secure data processing.

BACKGROUND

Services for performing analytics (e.g., statistics, aggregate queries, or the like) on sensitive data may involve sharing data with a third party. In some instances, it may not be desirable or feasible for one or more parties sharing data to share plaintext data. For example, the data may be sensitive data that is not permitted to be shared. In some instances, the parties sharing the data may be mutually distrusting parties. In other instances, use of a trusted third party may not be feasible as the trusted third party may become compromised.

SUMMARY

Methods, systems, and articles of manufacture, including computer program products, are provided for privacy-preserving demand estimation.

According to an aspect, a system includes at least one data processor and at least one memory storing instructions which, when executed by the at least one data processor, result in operations including: receiving, by a first party, a request to provide a projection; receiving, by the first party, a key; in response to the request, performing, by the first party, a partial projection using private data of the first party without sharing the private data with at least one other party; encrypting, by the first party, the partial projection using the key; sending, by the first party, the encrypted partial projection to an aggregator; combining, by the aggregator; the encrypted partial projection provided by the first party with at least one other encrypted partial projection provided by the at least one other party to generate an encrypted combined projection; sending, by the aggregator, the encrypted combined projection to a decryptor to enable the decryptor to decrypt the encrypted combined projection into plaintext; and receiving, by the first party, a decrypted combined projection responsive to the request to provide the projection.

In some variations, one or more of the features disclosed herein including the following features can optionally be included in any feasible combination. The request may indicate the projection of demand is to be performed based on at least private data at the first party and at the at least one other party. The key may comprise a public key. The public key may be received from the decryptor. The at least one other party receives a corresponding public key from the decryptor. The partial projection may be generated using as an input at least the first party's historical data, wherein the partial projection is generated using as an input at least the at least one other party's historical data. The historical data may be pre-processed into a format common to the first party and the at least one other party. The combining may include a sum of the encrypted partial projections provided by each of the first party and the at least one other party. The encrypted combined projection, which is sent to the decryptor, may include the sum of the encrypted partial projections provided by each of the first party and the at least one other party.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
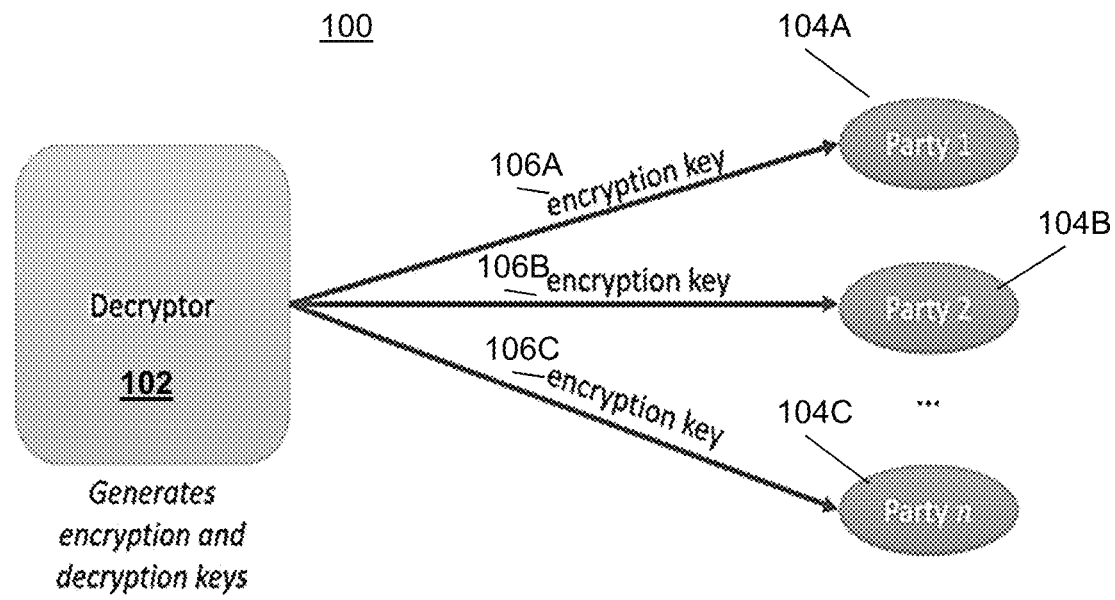
FIG. 1A depicts a system including a decryptor and a plurality of parties, in accordance with some embodiments.

Like labels are used to refer to same or similar items in the drawings.

DETAILED DESCRIPTION

Competitor companies producing the same or similar goods may want to forecast target values based on historic, time-stamped data distributed across the companies. To project or forecast the quantity of goods to produce in the future for example, the projection (or forecast) may be determined based on previous orders, how the stock of certain products can change in the coming weeks based on historic information, forecast manufacturing costs associated with seasonal trends, and/or other values. Each of these competitor companies may only have a partial view of the entire market and a limited number of samples, so for example, the volume or quantity of historical data may not be sufficient to forecast accurately or the historical data used for forecasting may contain gaps.

However, a combined view of data across companies may improve the forecasting for a given company, when compared to forecasting using only the data of the given company. Although sharing data across companies can provide enhanced forecasting, this sharing can compromise a company's private, business-critical, or other sensitive/proprietary data to a competitor. For example, a company such as a fashion retailer may forecast clothes production or purchasing using its past sales data as well as sales data from competitors. In this example, the company (as well as the competitors) may want to obtain a forecast for production but the company would not want to share actual sales and production data with competitor fashion retailers.

An approach to enable data sharing among the competitor companies can be to use a trusted third party. For example, the competitors may choose or agree to share historical data to enable data forecasting with a third party service not affiliated with the competitor companies, such as a third party cloud service or other type of service or application. In this example, the third party may incur costs (e.g., costs to provide the service, legal burden, risk, and/or overhead), and the third party may represent a single point of failure, so a single attack on the third party compromises the data from all of the companies. To address at least in part one or more of the noted issues with data sharing for forecasting, there is provided a cryptographic protocol that only reveals what is required to perform the forecasting (or other operation).

Before providing additional details regarding the cryptographic protocol that only reveals what is required to perform the forecasting (or other operation), the following provides some context with respect to time series data.

Consider a time series T that is a list of observations such as observed values v with an associated timestamp t for the occurrence of the observed value, so the form of the values and time stamps is as follows: $(v_0, t_0), (v_1, t_1), \ldots, (v_m, t_m)$. For example, the time series can represent value $v_0$ at time $t_0$, value $v_1$ at time $t_1$ and so forth. Referring to the retailer example, historical data regarding quantity of items sold items on a given day may correspond to value $v_0$ at time $t_0$ and so forth. The historical data (or past observations) may be used to forecast future values and trends; in other words, the historical data can be used to provide a forecast of demand for the items at a future time. The forecasting may take into account other observations, such as weather, whether a certain date was a holiday, and the like. The other types of observations may also be included in the time series.

Although these other types of observations can be included in the time series historical data to provide the forecast, some of the examples disclosed herein do not illustrate the use of these other types of observations in order to simplify the description. Moreover, for simplicity of notation, the value $v_i$ refers to the observation (e.g., value) at the $i^{th}$ timestamp.

The prediction $p_k$ (at a future point in time denoted $t_k$ (k>m)) may be determined based on the following equation:

$$p_k = p_{k-1} + \alpha(v_{k-1} - p_{k-1}) \text{ where } p_0 = v_0,$$

wherein $p_{k-1}$ is a past prediction at time k−1, $\alpha$ is a smoothing function or factor, and $v_{k-1}$ is an observation at time k−1. In this example, the prediction $p_k$ at timestamp k is determined based on previous predictions, wherein the error of previous forecasts is weighted with the smoothing function $\alpha$ (which is a value between 0 and 1). In this example, the smoothing is called exponential smoothing as the smoothing factor is multiplied in each step, so older observations receive exponentially smaller weights compared to newer ones. Although the previous example uses exponential smoothing, other types of smoothing functions may be used as well.

The prediction $p_k$ may be determined using an alternative representation of the equation as follows:

$$p_k = \alpha \cdot v_{k-1} + \alpha(1-\alpha) \cdot v_{k-2} + \alpha(1-+)^2 \cdot v_{k-3} + \ldots + \alpha \cdot (1-\alpha)^{k-2} \cdot v_1 + (1-\alpha)^{k-1} \cdot v_0,$$

which can be simplified as follows:

$$p_k = \beta_{k-1} \cdot v_{k-1} + \ldots + \beta_0 \cdot v_0,$$

so the $\alpha$-based coefficients of observation $v_i$ are denoted as $\beta_i$ for the i-th coefficient.

The parties may use different time stamps and associated features or observations as well. When this is the case, the different time stamps or different types of observations may be pre-processed into a common format. For example, these other types of observations, such as weather and the like, may also be used to impact the prediction. To illustrate further, different parties may have different additional observations (e.g., features describing the same target observation $v_i$, such as different ways to describe weather). As part of pre-processing for example, the similar (and/or different) aspects may be mapped to the same type to allow merging of these observations. For example, party 1 may describe temperature in Fahrenheit, while party 2 uses Celsius, the pre-processing may merge these into a single, common type. To merge high-dimensional time series samples (e.g., with many features), clustering approaches or similarity hashing (which maps similar inputs to the same outputs with high probability) may be used. For example, the mapping may map high temperatures to an output representing hot. The parties perform this pre-processing, and the party requesting the forecasting computation may add restrictions (e.g., only observations where the weather was hot) so that only similar inputs with the restrictions are considered.

In some embodiments, there is provided a cryptographic data sharing protocol that does not rely on a trusted third party and/or provides an efficient encrypted data processing. In some embodiments, the cryptographic data sharing protocol uses additive homomorphic encryption (AHE). Homomorphic encryption generally refers performing computations on encrypted data without first decrypting the encrypted data, such that the resulting computations performed in encrypted data yields the same results as if the computation had been performed in plaintext (un-encrypted) form. AHE is a form of homomorphic encryption where addition is performed on encrypted values (rather than on unencrypted text also referred to as plaintext).

Formally, let Enc(a) denote the encryption of a plaintext value a. With AHE, Enc(a+b) may be computed given Enc(a) and Enc(b); in other words, addition can be performed using the encrypted values without learning (e.g., by decrypting) the underlying plaintext values of a and b. Similarly, the multiplication of the plaintext a with a public constant c may be determined based on the encryption of a, so Enc(c·a) can be determined given plaintext constant c and Enc(a).

In some embodiments, the cryptographic data sharing protocol using AHE relies on an asymmetric encryption scheme where a public encryption key is given to all the parties that want to encrypt something, and a secret decryption key is kept private and only the decryption key can be used to perform the decryption.

FIG. 1A depicts a system 100 including a decryptor 102 and a plurality of parties 104A-C, in accordance with some embodiments. The decryptor 102 may generate encryption keys, such as encryption keys 106A-C, that are provided to the parties 104A-C. The parties may correspond to the competitor companies that want to estimate a projection (e.g., forecast or estimate) for demand using historical data across companies/parties. Alternatively, or additionally, the decryptor 102 may generate decryption keys for the AHE disclosed herein. In the example of FIG. 1A, the decryptor 102 may store (or keep) the decryption key private and, as such, is the only entity that can decrypt results. For example, the decryptor 102 may send 106A-C a public key to each of the parties 104A-C, while the corresponding private key is retained by the decryptor 102.

Figure 1B:
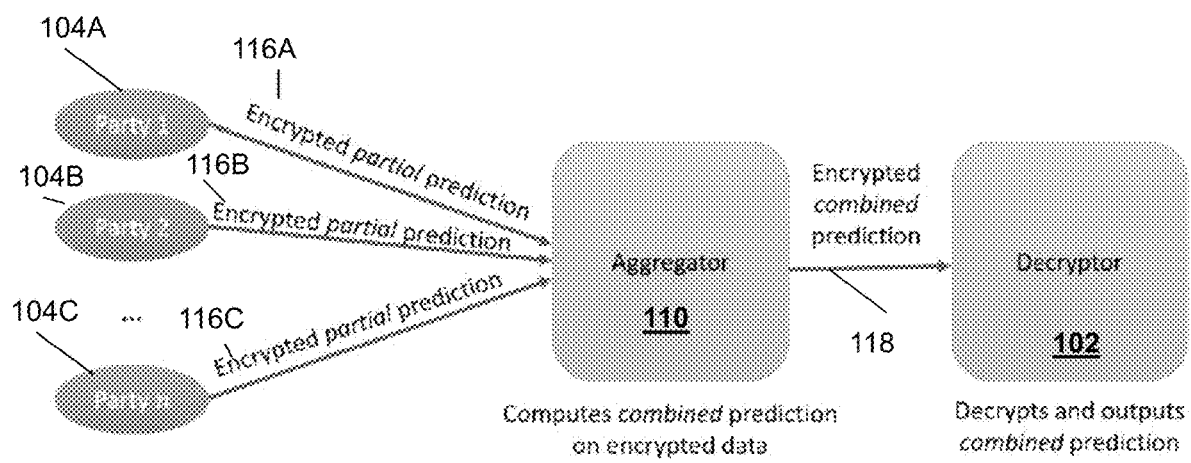
FIG. 1B depicts the system of FIG. 1A extended to include an aggregator, in accordance with some embodiments.

FIG. 1B depicts the system 100 extended to show an aggregator 110, in accordance with some embodiments. The plurality of parties 104A-C may each determine a partial prediction, such as a forecast of the demand. For example, the party 104A may determine a "partial" forecast of demand for a product based on the historical data at (or available to) party 104A; the party 104B may determine a "partial" forecast of demand for a product based on the historical data at (or available to) party 104B; and the party 104C may determine a "partial" forecast of demand for a product based on the historical data at (or available to) party 104C. As such, a given party is not sharing its observations (e.g., private, historical data such as detailed sales data for a product) with the other parties. Although some of the examples refer to "historical data" to predict demand, other types of data may be used as well.

Each of the parties 104A-C may encrypt their corresponding partial forecast using the public key provided at 106A. Next, each of the parties 104A-C may provide the encrypted partial forecasts (e.g., encrypted partial predictions 116A-C) as inputs to the aggregator 110, which sums or combines, using AHE, the encrypted partial predictions 116A-C to form an encrypted combined prediction. The aggregator 110 may then forward (e.g., send, provide, and the like) the encrypted combined prediction 118 to the decryptor 102, where the encrypted combined prediction can be decrypted using the secret key. The decrypted combined prediction (which is in plaintext) may thus represent a prediction of the forecast of demand that uses the combined data of the parties 104A-C.

The decryptor 102 may begin the process by providing encryption keys 106A-C to each of the parties 104A-C as shown at FIG. 1A. Next, the parties 104A-C each computes a partial prediction using only their data (e.g., data available to or at a given party). The partial prediction is then encrypted using the encryption key. Each of the parties sends the encrypted partial predictions to the aggregator 110. In this way, a party shares a partial prediction without sharing the party's private data.

To compute the partial predictions, each of the parties 104A-C determines a partial prediction (e.g., forecast of demand using historical or other types of data) and encrypts the partial prediction values before sending 116A-C to the aggregator 110. In the following example, the superscript j refer to an observation from party j, e.g., $v_1^j$ refers to the observed value at the i-th timestamp from party j. The coefficients $\beta_0, \ldots, \beta_{k-1}$ may all be computed with knowledge of the smoothing factor $\alpha$ (which may be a public or non-private value known to all parties 104A-C). In this example, the parties 104A-C know all of the coefficients $\beta_0, \ldots, \beta_{k-1}$. Each of the parties j computes a partial prediction, which can be represented as follows:

$$p_k^j = \beta_{k-1} \cdot v_{k-1}^j + \ldots + \beta_0 \cdot v_0^j,$$

and as noted, each party's prediction is based on their own values (e.g., private values known to a given party but not shared with the other parties). When a given party j determines a partial prediction, the party j may encrypt its partial prediction before sharing the partial prediction. By encrypting the partial prediction, the party j is limiting the information being shared to only what is necessary to allow the aggregate prediction determination across competitors. By sharing only an encrypted form of the partial prediction, so-called reverse engineering of the underlying data yielding the partial prediction can be prevented.

At 116A-C, each of the parties 104A-C sends an encrypted, partial prediction $Enc(p_k^j)$ to the aggregator 110.

The aggregator 110 receives as an input the partial predictions 116A-C $Enc(p_k^1), \ldots, Enc(p_k^n)$ (where n represents number of parties). The aggregator may then compute, using the encrypted partial predictions, an encrypted sum, $Enc(p_k)$, which can be represented as follows:

$$Enc(p_k) = Enc(p_k^1 + \ldots + p_k^n).$$

At this point, the aggregator 110 has $Enc(p_k)$, which is the encrypted sum of the partial predictions provided by each of the parties. The aggregator does not have a key to decrypt the encrypted sum $Enc(p_k)$, so the privacy of the encrypted sum is preserved.

At 118, the aggregator 110 may forward the encrypted sum of the partial predictions $Enc(p_k)$ to the decryptor 102. As the decryptor has the decryption key, the decryptor decrypts the encrypted sum $Enc(p_k)$ to reveal the plaintext value of $p_k$, which represents the prediction based on the combined predictions and data across the parties 102A-C. The decryptor may then share the "combined" prediction $p_k$ with each of the parties 102A-C. The prediction is "combined" in the sense that the prediction is based on the predictions of the parties 102A-C using data from across those parties.

In some implementations, the aggregator 110 (or the decryptor 102) may apply a linear function $f$ to $p_k$ as the $Enc(p_k)$ is an additive homomorphic encryption (AHE). For example, with $$f(x) = \frac{1}{n}x$$

$f(p_k)$ corresponds to the combined prediction for the average value over all of the parties 102A-C $$\left(\text{i.e., } \frac{1}{n}(v_i^1 + \ldots + v_i^n)\right)$$

for i-th observation averaged over all parties. For $f(x)=x$ (without the linear function), the predicted sum over all of the parties is determined $$(\text{e.g., } v_i^1 + \ldots + v_i^n).$$

In some embodiments, the aggregator 110 and the decryptor 102 do not collaborate in the sense that the aggregator only sends the encrypted combined prediction to the decryptor.

In some embodiments, the role of the aggregator 110 may be performed by one of the input parties.

In some embodiments, the decryptor 102 does not have to be a single entity (e.g., a single server) but multiple entities (e.g., multiple cloud servers) can be used such that the secret key is split and distributed among these multiple entities (e.g., the multiple entities work together to perform the decryption, so no single entity is able to decrypt on its own).

Figure 1C:
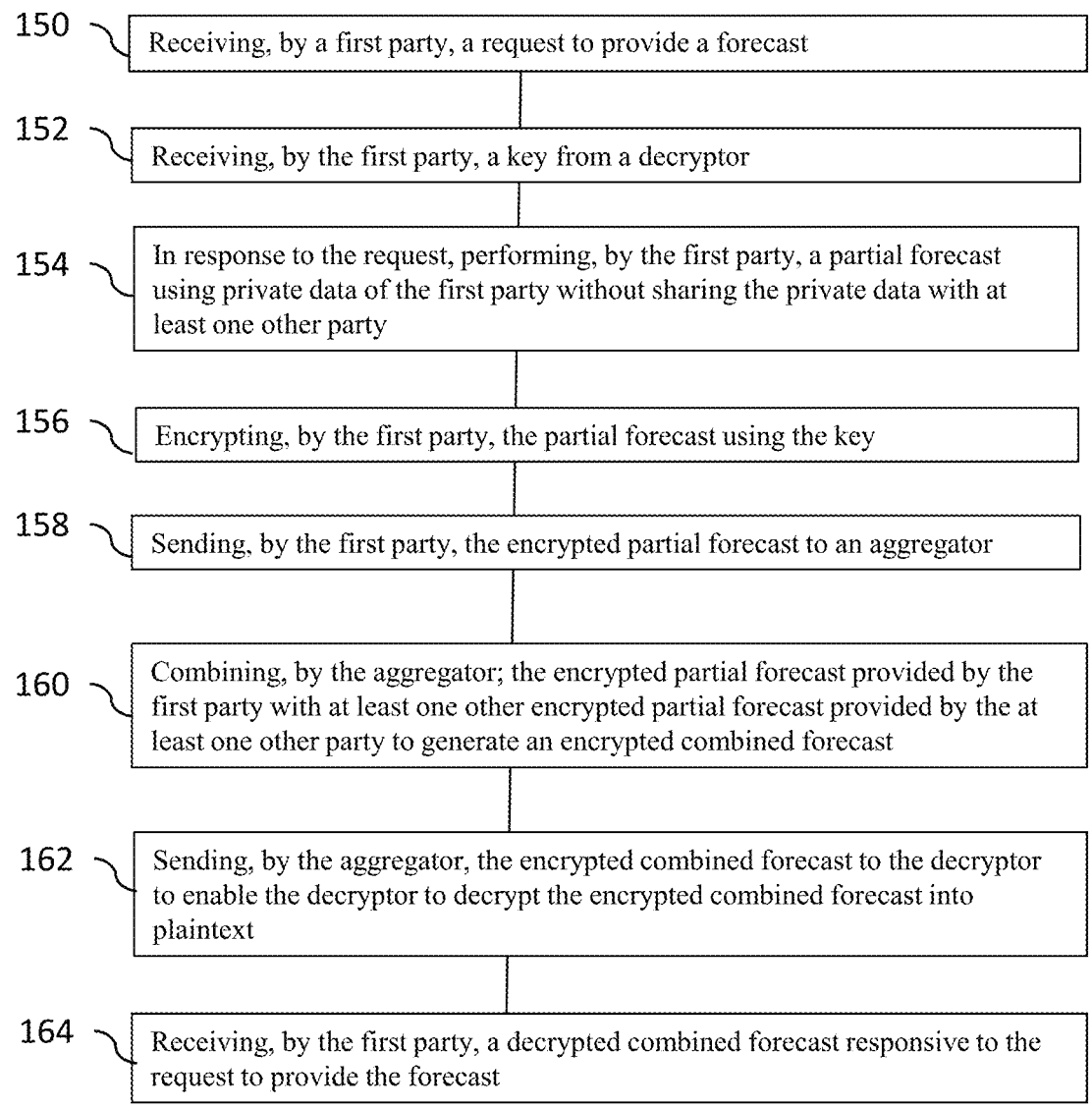
FIG. 1C depicts an example of a process for a cryptographic protocol used to determine a forecast across entities, in accordance with some embodiments.

FIG. 1C depicts an example of a process, in accordance with some example embodiments.

At 150, a request may be received to provide a projection, such as a forecast (e.g., a prediction or estimate of future demand for an item). For example, party 104A may receive a request to provide the prediction of future demand for bread.

At 152, each of the parties may receive a key. For example, each of the parties 104A-C may receive a public key from the decryptor 102 (or other source of the public key). Each of the parties in this example have opted into using the process of FIG. 1C to obtain projections (e.g., forecasts or estimates of future demand) using a cryptographic protocol that protects company private historical data of sales, for example.

At 154, each of the parties may perform a partial projection. The projection is partial in the sense that it only uses the historical data available locally at each party. For example, party 104A performs a partial projection of demand for an item using only party 104A historical sales data, so party 104A's private data is kept private and not shared with the other parties. Likewise, party 104B performs a partial projection of demand for an item using only party 104B historical sales data; and so forth.

At 156, each of the parties may encrypt the partial projection using the key provided at 152. For example, each of the parties 104A-C may encrypt, using the public key from the decryptor 102, the partial projection.

At 158, each of the parties may send the encrypted partial projection to an aggregator. For example, each of the parties 104A-C may send the encrypted partial projection to the aggregator 110.

At 160, the encrypted partial projections are combined, such as summed. As noted, AHE enables computation of the sum of encrypted partial projections given the encrypted partial projections sum of the encrypted partial projections to be mathematically equivalent to the sum of the plaintext version of the partial predictions. As the aggregator does not have any keys to decrypt what was provided by the parties, the information provided by each of the parties is secure. Moreover, a linear function f (as noted above) may be applied to the combined encrypted partial projections.

At 162, the aggregator sends the encrypted sum to a decryptor. For example, the aggregator 110 sends 118 the encrypted sum of the predictions to the decryptor 102, such that the decryptor decrypts the encrypted sum of predictions and provides the sum of predictions as a response to the request received at 150. As such, the party (e.g., party 104A) receives, at 164, plaintext combined projection that is responsive to the request received at 150. This example also illustrates that neither the decryptor nor the aggregator has access to the underlying data used to determine the partial predictions.

In some embodiments, the aggregator 110 may be omitted by allowing the parties to communicate with each other. When this is the case, each party j masks their partial predictions $p_s^1$ with a sufficiently large random masking value $r^j$, and sends partial masks $r_1^j, \ldots, r_n^j$ to each of the other parties. The sum of partial masks corresponds to the negative random masking (e.g., $-r^j = r_1^j + \ldots + r_n^j$). Here, the decryptor 102 receives only the encrypted and masked partial predictions whose sum corresponds to the combined prediction (e.g., the masking is removed since $r^j + r_1^j + \ldots + r_n^j = r^j - r^j = 0$ for each party j). To illustrate with 2 parties for example, a first party ($p^1$) draws random mask $r^1$ and sends $Enc(-r^1)$ to party 2. The second party ($p^2$) draws random mask $r^2$ and sends $Enc(-r^2)$ to the first party. Next, the first party computes $Enc(p_k^1 + r^1 - r^2)$ and sends the encrypted prediction to the decryptor 102. Similarly, the second party computes $Enc(p_k^2 + r^2 - r^1)$ and sends encrypted prediction to the decryptor 102. Each partial prediction is masked (which prevents the decryptor from learning each party's partial prediction). However, the decrypted sum of partial predictions is the combined prediction (e.g., $(p_k^1 + r^1 - r^2) + (p_k^2 + r^2 - r^1) = p_k^1 + p_k^2 = p_k$) as the masks per party cancel each other. The decryptor 102 may thus learn the combined prediction, but not any party's partial prediction.

To further illustrate the noted two party example, the first party may receive a request to provide a forecast and receive a public key from a decryptor. The first party also receives (or generates) a random masking value $r_j$. Thus in response to the request, the first party can perform the partial forecast using private data of the first party. The first party encrypts the partial forecast along with the random masks $+r^1$ and $-r^2$ (which is received from at least one other party) forming the following: $Enc(p_k^1 + r^1 - r^2)$. Rather than send this to an aggregator to aggregate with the partial prediction of party 2, the first party sends to the decryptor the encrypted partial prediction (which has been randomized or masked with $+r^1$ and $-r^2$), so the first party sends $Enc(p_k^2 + r^2 - r^1)$. The decryptor decrypts $Enc(p_k^2 + r^2 - r^1)$. As each of the partial predictions, $p_k^1$ and $p_k^2$ are masked (e.g., randomized), the decryptor does not learn the actual values of the partial predictions. Instead, the decryptor sums the plaintext values to reveal the combined prediction $p_k$ (e.g., $(p_k^1 + r^1 - r^2) + (p_k^2 + r^2 - r^1) = p_k^1 + p_k^2 = p_k$). The first party may then receive from the decryptor the plaintext combined forecast $p_k$ responsive to the request to provide the forecast.

In some embodiments, secret sharing may be used. Like AHE, secret sharing supports addition on encrypted values and multiplication with public constants. Secret sharing does not require key generation and additional participants (i.e., aggregator and decryptor) but requires communication between the parties. Secret sharing (which is a form of encryption) allows the parties to split a secret value v in n shares, denoted $Share(v) = (Share(v)_1, \ldots, Share(v)_n)$ where share $Share(v)_j$ is held by party j. A minimum number $t \leq n$ of shares is required to reconstruct (i.e., decrypt) the secret. Similar to AHE, each party j can compute $Share(a+b)_j$ given $Share(a)_j$ and $Share(b)_j$, also party j can compute $Share(c \cdot a)_j$ given c and $Share(a)_j$.

Figure 2A:
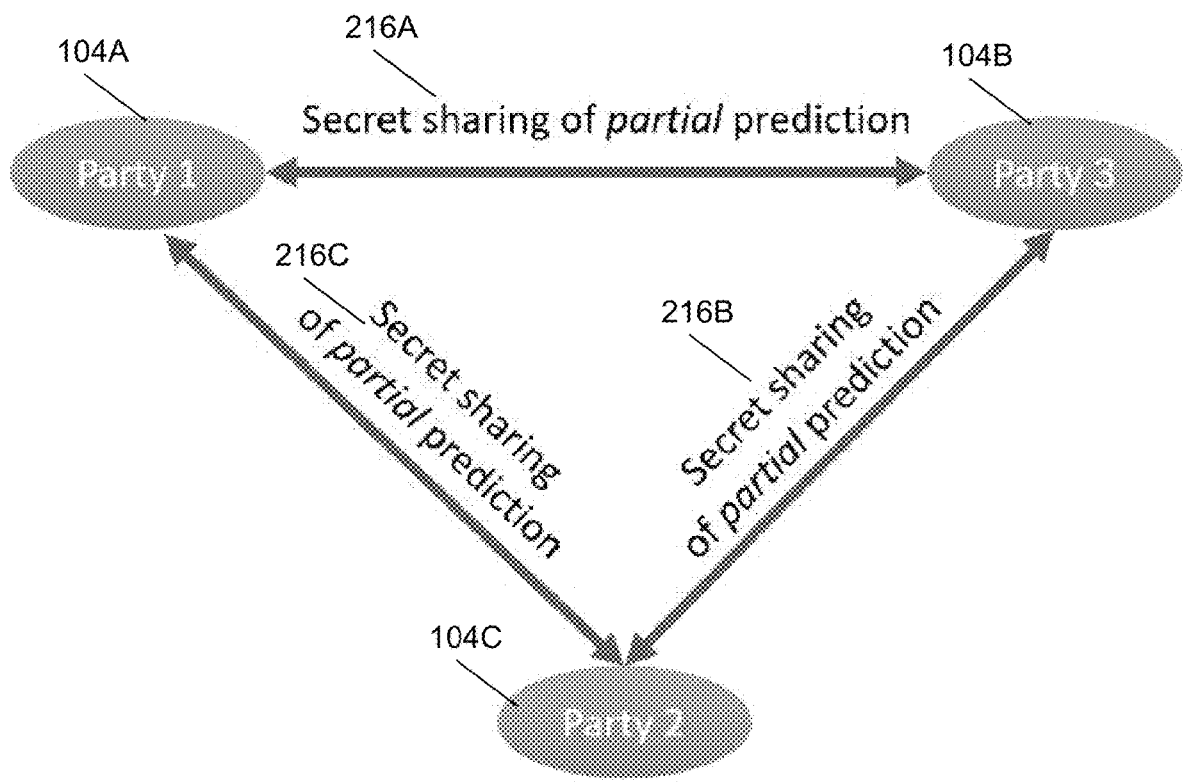
FIGS. 2A-2B depict parties configured to perform partial predictions using secret sharing, in accordance with some embodiments.
Figure 2B:
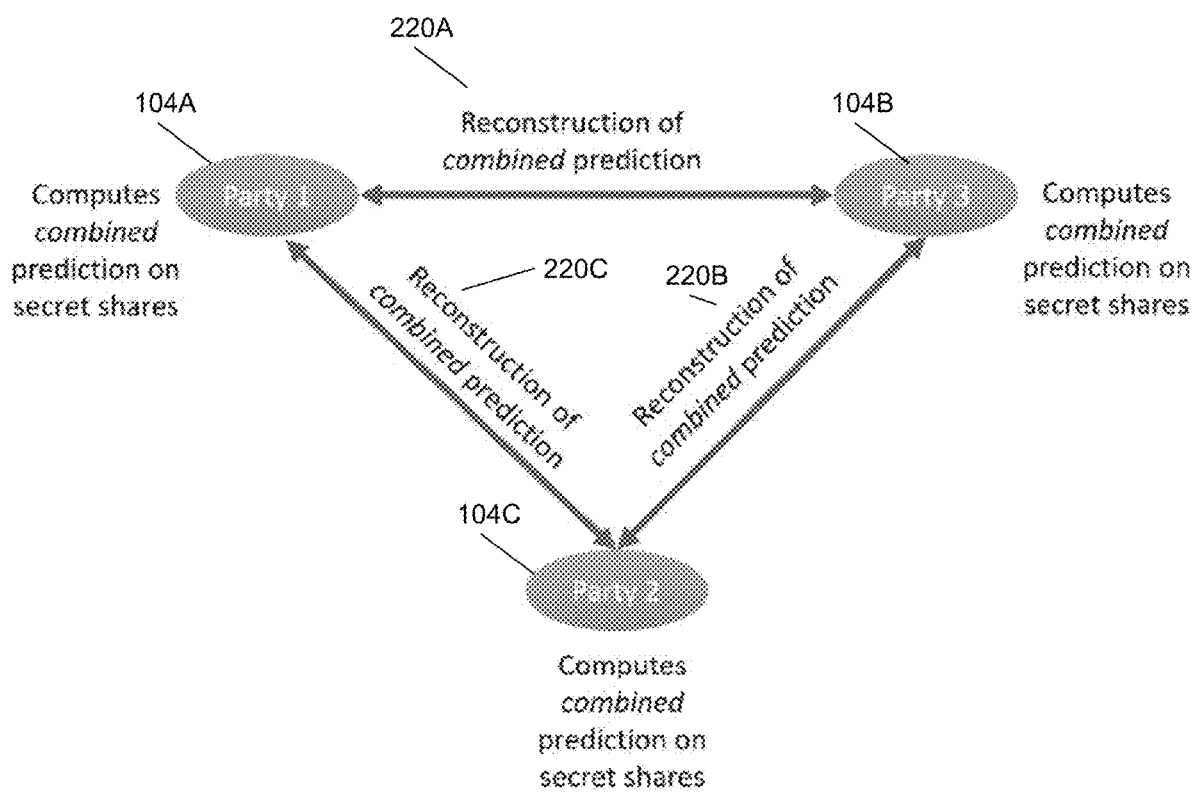

FIGS. 2A-2B depict three parties 104A-C configured to perform partial predictions using secret sharing, in accordance with some embodiments. Referring to FIG. 2A, each of the parties 104A computes a secret sharing of its partial prediction and sends shares of it to the other parties. Referring to FIG. 2B, the parties compute the secret sharing of the combined prediction locally (i.e., without communicating with each other). At least t of the n parties collaboratively decrypt the secret sharing of the combined prediction and output the combined prediction. The partial predictions and the combined predictions are computed as in the centralized AHE-solution detailed before. Instead of letting a decryptor operate on a single AHE-encrypted value (e.g., $Enc(v)$), each party itself operates on the secret shares (e.g., $Share(v)$), from the other parties.

The following provides another example of an approach to help estimate and forecast demand as explained in the following. In the case of demand forecast estimation, each company may have (or know) values for the demand samples and auxiliary information per sample, called a feature vector. The combined data from all of the companies may be denoted by $D = \{(d_1, \vec{x}_1), \ldots, (d_n, \vec{x}_n)\}$ and consists of n historic demand samples $d_i$ and corresponding feature vectors $\vec{x}_i = (x_{i,1}, \ldots, x_{i,m})$.

To illustrate by way of an example, consider m=2 features where the first feature indicates if a special offer (e.g., discount) was offered and the second feature indicates the month the product was sold. Suppose $d_1 = 10$ units of a product were bought while the product was on sale, indicated by $x_{1,1}=1$, during December, indicated by $x_{1,2}=12$. Only $d_2=2$ units were sold while the product was not on sale, i.e., $x_{2,1}=0$, in March, i.e., $x_{2,2}=3$.

The demand value $d_i$ is private (as it allows learning exactly how well a company operates and the number of sold units at a given time). The structure of the feature vector may be public (e.g., what feature corresponds to which position), but the feature values themselves may be considered private.

Let $Q=\{q_1, \ldots, q_k\}$ denote a set of possible quantities for the estimated demand and let $f(\cdot)$ be a demand function that maps a feature vector to a demand quantity $q \in Q$. In this example, $f$ can be used to estimate the demand (e.g., for certain months and promotions) as defined via the feature vector. Let $c_u$ be the underage cost (e.g., lost revenue when fewer units were in stock than could have been sold) and $c_o$ be the overage cost (e.g., cost to return or discard unsold units when too many units were in stock). A parameter called the service level is set to $$\alpha = \frac{c_u}{c_u + c_o}.$$

Let $\mathbb{I}(a<b)$ be the indicator function which returns 1 when $a<b$ and 0 if $a \geq b$.

A kernel function K may be used to create a weighted sum over the samples that map a feature vector to a demand quantity $q \in Q$. For example, a simple weighted sum over, say, samples 1, 2, 3 could be $0.1*1+0.2*2+0.7*3$ where the latter sample is given more weight as the first two; however, a kernel provides a more complex weighting scheme. Multiple kernel functions may exist and an example of a kernel function is, for example, a Gaussian Kernel $$K(\vec{x}) = \frac{1}{\sqrt{2\pi}} \exp(-\|\vec{x}\|_2^2 / 2),$$

where $\|\cdot\|_2$ is the $L_2$-norm and $\exp(\cdot)$ is the exponential function. Let $$K_b(\vec{x}) = \frac{1}{b} K\left(\frac{\vec{x}}{b}\right)$$

be the kernel function with bandwidth parameter b that smooths the estimation. This bandwidth parameter b may be pre-configured.

For example, demand may be estimated based on the following:

$$f(\vec{x}_{n+1}) = \min_{q \in Q} \left\{ \frac{\sum_{i=1}^{n} K_b(\vec{x}_{n+1} - \vec{x}_i) \cdot \mathbb{I}(d_i < q)}{\sum_{i=1}^{n} K_b(\vec{x}_{n+1} - \vec{x}_i)} \geq \alpha \right\}$$

Below, A refers to the numerator $\Sigma_{i=1}^{n} K_b(\vec{x}_{n+1} - \vec{x}_i) \mathbb{I}(d_i < q)$ and B refers to the denominator:

$$\sum_{i=1}^{n} K_b(\vec{x}_{n+1} - \vec{x}_i).$$

In other words, the equation for $f(\vec{x}_{n+1})$ finds the smallest quantity $(q \in Q)$ such that the fraction (A/B) above is larger or equal to the service level $(\alpha)$.

In some embodiments, secret sharing may be used, as noted, across companies. When secret sharing is used, this allows parties (e.g., companies) to split their secret value s (e.g., demand sample) in multiple shares $\langle s \rangle = (s_1, s_2, \ldots, s_n)$, one for each party, such that a minimum number t of shares is required to reconstruct the secret (t=n for additive secret sharing as used in the graphics). To illustrate, $\langle s \rangle_i = s_i$ refers to a share from party i (e.g., an encrypted value). Secret sharing allows parties to perform computations on the shares. In other words, it allows encrypted data processing. The data processing can be done locally (e.g., each party performs the computation by themselves) or collaboratively (e.g., all parties must interact with each other (i.e., send messages and shares). In the case of local processing, it may be considered more efficient as it requires little to no interaction and waiting until all messages are sent, received, and processed, so in some implementation disclosed herein local processing is described.

To illustrate by way of an example, linear, additive secret sharing for n=2 parties and threshold t=2 constructs shares $s_1$ and $s_2$ for s such that $s=s_1+s_2$ and $s_1$ and $s_2$ look random (e.g., by setting $s_1=s-r$ and $s_2=r$ where r is a random value and computations are done modulo a prime). Given two secret shares $\langle s \rangle = (s_1, s_2)$, $\langle u \rangle = (u_1, u_2)$ for example, the parties may perform addition locally as the sharing of the addition s+u is the addition of the shares (e.g., $\langle s+u \rangle = \langle s \rangle + \langle u \rangle = (s_1+u_1, s_2+u_2)$), where party 1 can compute $s_1+u_1$ and party 2 can compute $s_2+u_2$ locally without learning s+u. Similarly, multiplication with a known value p can be computed locally on the shares as $p \cdot \langle s \rangle = (p \cdot s_1, p \cdot s_2)$. Multiplication with a secret shared value may be considered more complex when compared to addition, so multiplication with a secret shared may require collaboration among the parties.

In some embodiments disclosed herein, the target feature $\vec{x}_{n+1}$ may be known to all parties and used to ask, for example, a query such as what will demand be like in the next month with a sales promotion. The service level $\alpha$ may also be public and the same for all parties. After a process in accordance with some embodiments, the parties learn the demand estimation but nothing else about its competitors. To simplify notation in the description, each party $i \in \{1, \ldots, n\}$ holds a demand sample $d_i$ with corresponding feature vector $x_i$ (which can be generalized to a company holding multiple samples).

Figure 2C:
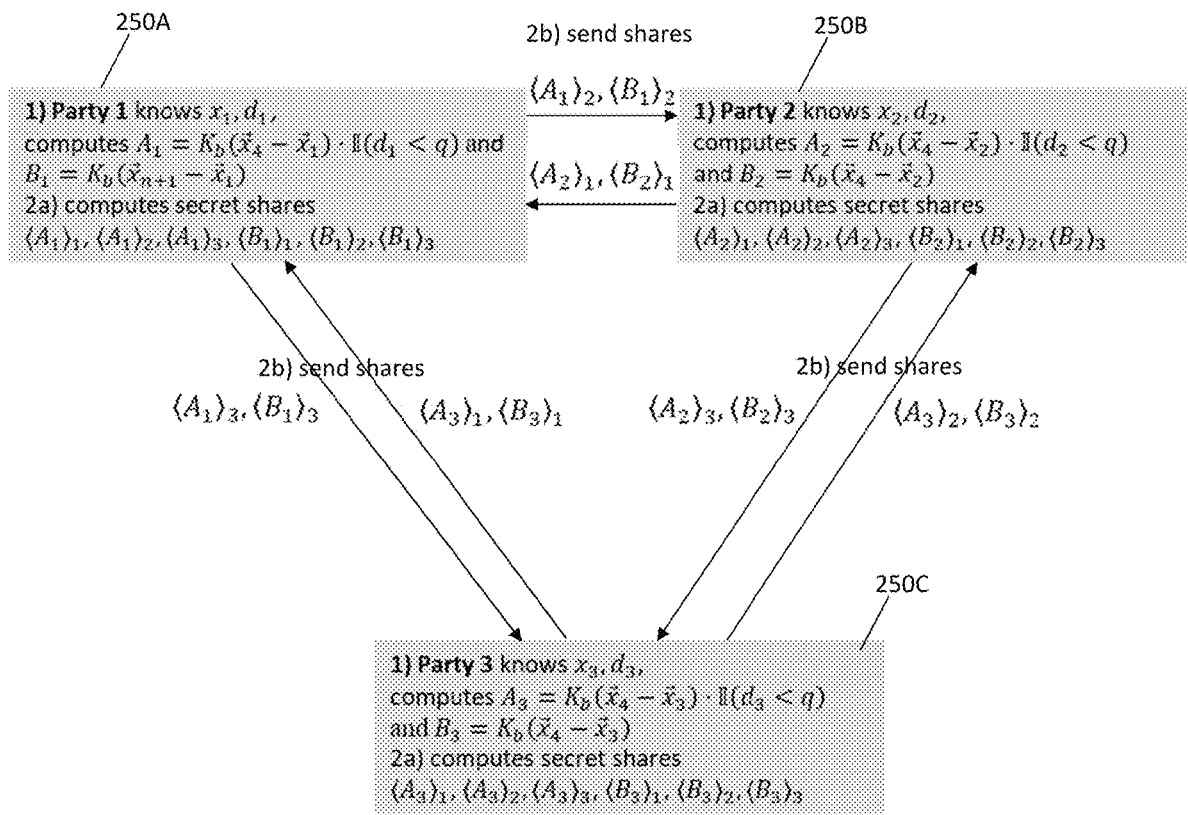
FIGS. 2C-D depict parties configured to perform secret sharing, in accordance with some embodiments.
Figure 2D:
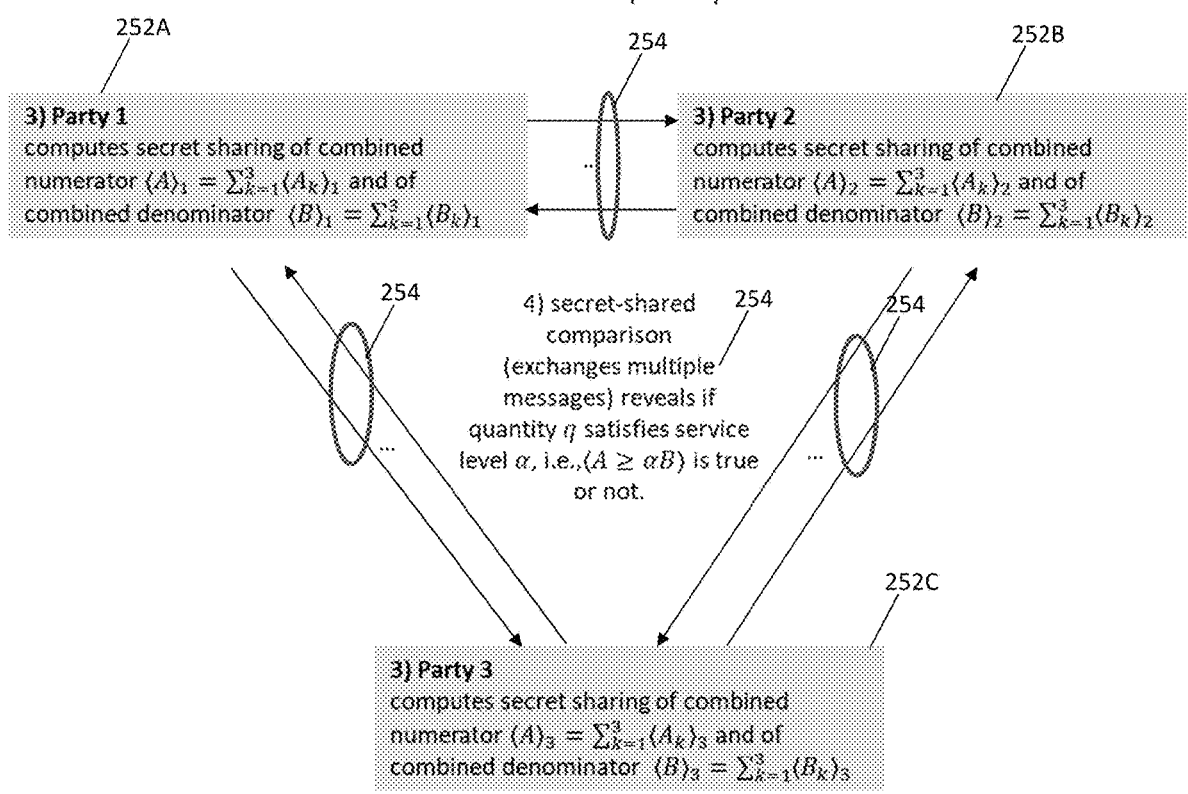

FIGS. 2C-2D depict an example of a process for a secret sharing process to forecast demand $f(\vec{x}_{+1})$, in accordance with some embodiments. Referring to FIGS. 2C-D which show an example of the process, for each forecast demand estimate $q \in Q$, sorted ascendingly, each party may, at 250A-C, locally compute numerator $A_i=K_b(\vec{x}_{n+1}-\vec{x}_i) \cdot \mathbb{I}(d_i<q)$ and denominator $B_i=K_b(\vec{x}_{n+1}-\vec{x}_i)$ and locally compute shares $\langle A_i \rangle_1, \ldots, \langle A_i \rangle_n$ of $A_i$ and shares $\langle B_i \rangle_1, \ldots, \langle B_i \rangle_n$ of $B_i$ and (b) send shares $\langle A_i \rangle_j$, $\langle B_i \rangle_j$ to party j (where j≠i). At 252A-C, each party locally computes the combined secret-shared numerator $\langle A \rangle_i = \Sigma_{k=1}^{n} \langle A_k \rangle_i$ and the combined secret-shared denominator $\langle B \rangle_i = \Sigma_{k=1}^{n} \langle B_k \rangle_i$ as the sum of their received shares. At 254, the parties collaboratively perform secure comparison ⟨A≥αB⟩ such that the parties only learn "true" (i.e., A≥αB) or "false" (i.e., A<αB). If it is "true", the parties stop and output the current q. If it is "false", the parties continue (i.e., use the next demand value from Q and perform the same steps). The demand q (at which the protocol stopped) is the desired demand estimation.

During the collaborative sharing at 254, each party computes A≥αB, i.e., $\Sigma_{i=1}^{n}K_b(\vec{x}_{n+1}-\vec{x}_i)\cdot\mathbb{I}(d_i<q)\geq\alpha\Sigma_{i=1}^{n}K_b(\vec{x}_{n+1}-\vec{x}_i)$ which is just a slight reformulation of the inequality:

$$\frac{\sum_{i=1}^{n}K_b(\vec{x}_{n+1}-\vec{x}_i)\cdot\mathbb{I}(d_i<q)}{\sum_{i=1}^{n}K_b(\vec{x}_{n+1}-\vec{x}_i)}\geq\alpha,$$

which avoids division (which is costly in secure computation). To summarize, each of the parties may determine (e.g., compute) the secret shares corresponding to a partial forecast (e.g., of demand), send (e.g., share) the secret shares corresponding to a partial forecast (e.g., of demand) with the other parties, determine (e.g., compute the combined secret shares, and then perform a secure comparison to until the demand is estimated.

For very large number of demand candidates in Q, the large Q may be split into ore more ranges and find the best range. Thus, fewer collaborative operations may be performed overall. To illustrate, for Q={1, 2, . . . , 1000} one can define ranges {1, . . . , 100}, {101, . . . , 200}, {901, 1000}. A "best" or "optimum" range contains the actual demand estimate (e.g., range {101, . . . , 200}) and its endpoint (e.g., endpoint 200) is output by the above noted process, when the inputs are the endpoints of ranges (e.g., {100, 200, . . . , 1000} is the input and not {1, 2, . . . , 1000}). The range may be iteratively split into smaller ranges again (e.g., {101, . . . , 110}, {111, . . . , 120}, . . . , {191, . . . , 200}) and find a so-called best range until a range that is small enough (e.g., contains only one element) is found which is the final output (e.g., the demand estimate).

Figure 3:
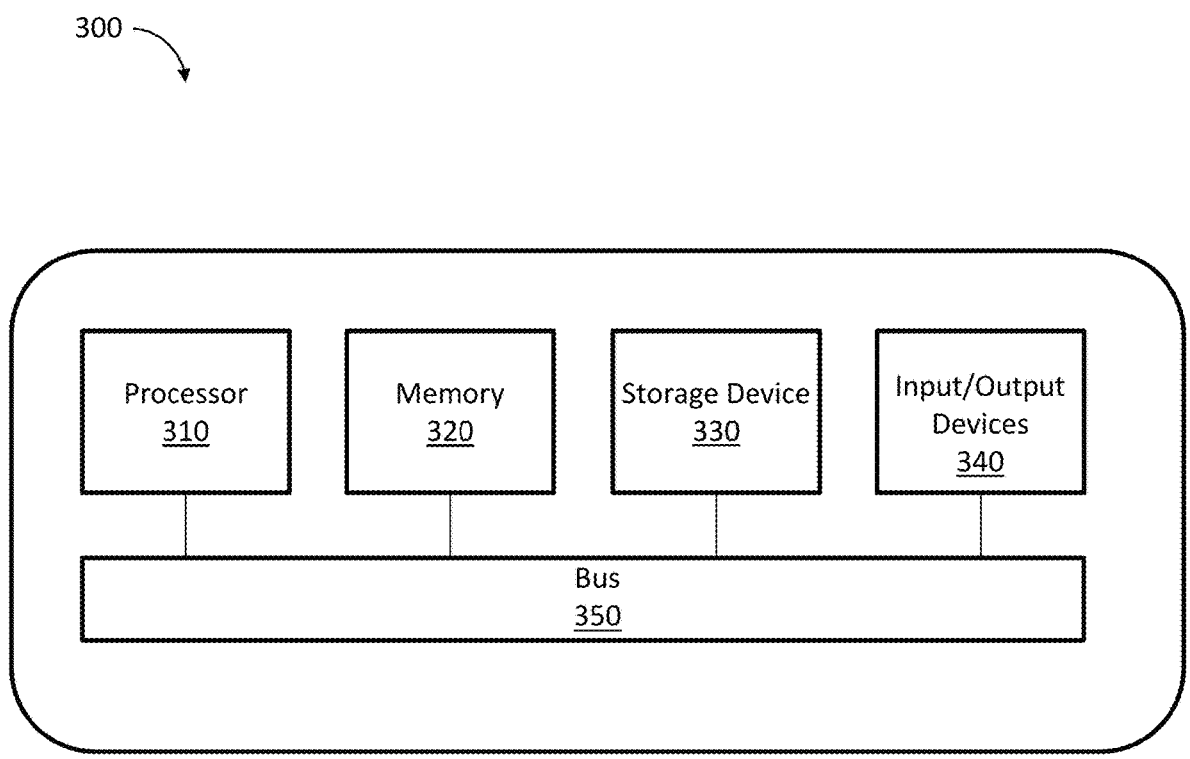
FIG. 3 depicts a block diagram illustrating a computing system consistent with implementations of the current subject matter.

FIG. 3 depicts a block diagram illustrating a computing system 300 consistent with implementations of the current subject matter. For example, the system 300 can be used to implement each of the parties such as 104A-C, the decryptor 102, and/or the aggregator 110.

As shown in FIG. 3, the computing system 300 can include a processor 310, a memory 320, a storage device 330, and input/output devices 340. According to implementations of the current subject matter, a trusted execution environment may be a secure area that may be contained in the processor 310, or it may be an additional hardware and/or software component. The trusted execution environment may run enclaves to guarantee confidentiality and integrity protection to code and data contained therein, even in an untrusted environment.

The processor 310, the memory 320, the storage device 330, and the input/output devices 340 can be interconnected via a system bus 350. The processor 310 is capable of processing instructions for execution within the computing system 300. Such executed instructions can implement one or more components of, for example, the trusted server, client devices (parties), and/or the like. In some implementations of the current subject matter, the processor 310 can be a single-threaded processor. Alternately, the processor 310 can be a multi-threaded processor. The process may be a multi-core processor have a plurality or processors or a single core processor. The processor 310 is capable of processing instructions stored in the memory 320 and/or on the storage device 330 to display graphical information for a user interface provided via the input/output device 340.

The memory 320 is a computer readable medium such as volatile or non-volatile that stores information within the computing system 300. The memory 320 can store data structures representing configuration object databases, for example. The storage device 330 is capable of providing persistent storage for the computing system 300. The storage device 330 can be a floppy disk device, a hard disk device, an optical disk device, or a tape device, or other suitable persistent storage means. The input/output device 340 provides input/output operations for the computing system 300. In some implementations of the current subject matter, the input/output device 340 includes a keyboard and/or pointing device. In various implementations, the input/output device 340 includes a display unit for displaying graphical user interfaces.

According to some implementations of the current subject matter, the input/output device 340 can provide input/output operations for a network device. For example, the input/output device 340 can include Ethernet ports or other networking ports to communicate with one or more wired and/or wireless networks (e.g., a local area network (LAN), a wide area network (WAN), the Internet).

In some implementations of the current subject matter, the computing system 300 can be used to execute various interactive computer software applications that can be used for organization, analysis and/or storage of data in various (e.g., tabular) format (e.g., Microsoft Excel®, and/or any other type of software). Alternatively, the computing system 300 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 340. The user interface can be generated and presented to a user by the computing system 300 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising A system, comprising: at least one data processor; and at least one memory storing instructions which, when executed by the at least one data processor, result in operations comprising: receiving, by a first party, a request to provide a forecast; receiving, by the first party, a key; in response to the request, performing, by the first party, a partial forecast using private data of the first party without sharing the private data with at least one other party; encrypting, by the first party, the partial forecast using the key; sending, by the first party, the encrypted partial forecast to an aggregator; combining, by the aggregator; the encrypted partial forecast provided by the first party with at least one other encrypted partial forecast provided by the at least one other party to generate an encrypted combined forecast; sending, by the aggregator, the encrypted combined forecast to a decryptor to enable the decryptor to decrypt the encrypted combined forecast into plaintext; and receiving, by the first party, a decrypted combined forecast responsive to the request to provide the forecast.

Example 2: The system of Example 1, wherein the request indicates the forecast of demand is to be performed based on at least private data at the first party and at the at least one other party.

Example 3: The system of any of Examples 1-2, wherein the key comprises a public key.

Example 4: The system of any of Examples 1-3, wherein the public key is received from the decryptor.

Example 5: The system of any of Examples 1-4, wherein the at least one other party receives a corresponding public key from the decryptor.

Example 6: The system of any of Examples 1-5, wherein the partial forecast is generated using as an input at least the first party's historical data, wherein the partial forecast is generated using as an input at least the at least one other party's historical data.

Example 7: The system of any of Examples 1-6 further comprising: pre-processing, the historical data, into a format common to the first party and the at least one other party.

Example 8: The system of any of Examples 1-7, wherein the combining comprises a sum of the encrypted partial forecasts provided by each of the first party and the at least one other party.

Example 9: The system of any of Examples 1-8, wherein the encrypted combined forecast, which is sent to the decryptor, comprises the sum of the encrypted partial forecasts provided by each of the first party and the at least one other party.

Example 10: A method comprising: receiving, by a first party, a request to provide a forecast; receiving, by the first party, a key; in response to the request, performing, by the first party, a partial forecast using private data of the first party without sharing the private data with at least one other party; encrypting, by the first party, the partial forecast using the public key; sending, by the first party, the encrypted partial forecast to an aggregator; combining, by the aggregator; the encrypted partial forecast provided by the first party with at least one other encrypted partial forecast provided by the at least one other party to generate an encrypted combined forecast; sending, by the aggregator, the encrypted combined forecast to a decryptor to enable the decryptor to decrypt the encrypted combined forecast into plaintext; and receiving, by the first party, a decrypted combined forecast responsive to the request to provide the forecast.

Example 11: The method of Example 10, wherein the request indicates the forecast of demand is to be performed based on at least private data at the first party and at the at least one other party.

Example 12: The method of any of Examples 10-11, wherein the key comprises a public key.

Example 13: The method of any of Examples 10-12, wherein the public key is received from the decryptor.

Example 14: The method of any of Examples 10-13, wherein the at least one other party receives a corresponding public key from the decryptor.

Example 15: The method of any of Examples 10-14 wherein the partial forecast is generated using as an input at least the first party's historical data, wherein the partial forecast is generated using as an input at least the at least one other party's historical data.

Example 16: The method of any of Examples 10-15 further comprising: pre-processing, the historical data, into a format common to the first party and the at least one other party.

Example 17: The method of any of Examples 10-16, wherein the combining comprises a sum of the encrypted partial forecasts provided by each of the first party and the at least one other party.

Example 18: The method of any of Examples 10-17, wherein the encrypted combined forecast, which is sent to the decryptor, comprises the sum of the encrypted partial forecasts provided by each of the first party and the at least one other party.

Example 19: A non-transitory computer-readable storage medium including instructions which, when executed by at least one data processor, result in operations comprising: receiving, by a first party, a request to provide a forecast; receiving, by the first party, a key; in response to the request, performing, by the first party, a partial forecast using private data of the first party without sharing the private data with at least one other party; encrypting, by the first party, the partial forecast using the key; sending, by the first party, the encrypted partial forecast to an aggregator; combining, by the aggregator; the encrypted partial forecast provided by the first party with at least one other encrypted partial forecast provided by the at least one other party to generate an encrypted combined forecast; sending, by the aggregator, the encrypted combined forecast to a decryptor to enable the decryptor to decrypt the encrypted combined forecast into plaintext; and receiving, by the first party, a decrypted combined forecast responsive to the request to provide the forecast.

Example 20: The non-transitory computer-readable storage medium of Example 19, wherein the request indicates the forecast of demand is to be performed based on at least private data at the first party and at the at least one other party.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions which, when executed by the at least one data processor, result in operations comprising:
        receiving, by a first party, a request to provide a projection;
        receiving, by the first party, a key;
        in response to the request, performing, by the first party, a partial projection using private data of the first party without sharing the private data with at least one other party;
        encrypting, by the first party, the first partial projection using the key;
        sharing, by the first party, the encrypted first partial projection to at least a second party and a third party;
        receiving, by the first party, at least an encrypted second partial projection computed by the second party and an encrypted third partial projection computed by the third party;
        combining, by the first party based on additive homomorphic encryption, at least the encrypted first partial projection with the encrypted second partial projection and the encrypted third partial projection to generate an encrypted combined projection; and
        sending, by the first party, the encrypted combined projection to at least the second party and the third party to enable the encrypted combined projection to be decrypted into plaintext.

2. The system of claim 1, wherein the request indicates the projection is to be performed based on at least private data at the first party and private data at least at the second party and private data at the third party, wherein the projection estimates demand.

3. The system of claim 1, wherein the key comprises a public key.

4. The system of claim 1, wherein the second party and the third party each receives a corresponding public key.

5. The system of claim 1, wherein the first partial projection is generated using as an input at least the first party's historical data, wherein the second partial projection is generated using as an input at least the second party's historical data, and wherein the third partial projection is generated using as an input at least the third party's historical data.

6. The system of claim 5 further comprising:
pre-processing, the first party's historical data, the second party's historical data, and the third party's historical data, into a format common to the first party, the second party, and the third party.

7. The system of claim 1, wherein the combining comprises a sum using additive homomorphic encryption of at least the encrypted first partial projection, the encrypted second partial projection, and the encrypted third partial projection.

8. A method comprising:
receiving, by a first party, a request to provide a projection;
receiving, by the first party, a key;
in response to the request, performing, by the first party, a partial projection using private data of the first party without sharing the private data with at least one other party;
encrypting, by the first party, the first partial projection using the key;
sharing, by the first party, the encrypted first partial projection to at least a second party and a third party;
receiving, by the first party, at least an encrypted second partial projection computed by the second party and an encrypted third partial projection computed by the third party;
combining, by the first party based on additive homomorphic encryption, at least the encrypted first partial projection with the encrypted second partial projection and the encrypted third partial projection to generate an encrypted combined projection; and
sending, by the first party, the encrypted combined projection to at least the second party and the third party to enable the encrypted combined projection to be decrypted into plaintext.

9. The method of claim 8, wherein the request indicates the projection is to be performed based on at least private data at the first party and private data at least at the second party and private data at the third party, wherein the projection estimates demand.

10. The method of claim 8, wherein the key comprises a public key.

11. The method of claim 8, wherein the second party and the third party each receives a corresponding public key.

12. The method of claim 8, wherein the first partial projection is generated using as an input at least the first party's historical data, wherein the second partial projection is generated using as an input at least the second party's historical data, and wherein the third partial projection is generated using as an input at least the third party's historical data.

13. The method of claim 12 further comprising:
pre-processing, the first party's historical data, the second party's historical data, and the third party's historical data, into a format common to the first party, the second party, and the third party.

14. The method of claim 8, wherein the combining comprises a sum using additive homomorphic encryption of at least the encrypted first partial projection, the encrypted second partial projection, and the encrypted third partial projection.

15. A non-transitory computer-readable storage medium including instructions which, when executed by at least one data processor, result in operations comprising:
receiving, by a first party, a request to provide a projection;
receiving, by the first party, a key;
in response to the request, performing, by the first party, a partial projection using private data of the first party without sharing the private data with at least one other party;
encrypting, by the first party, the first partial projection using the key;
sharing, by the first party, the encrypted first partial projection to at least a second party and a third party;
receiving, by the first party, at least an encrypted second partial projection computed by the second party and an encrypted third partial projection computed by the third party;
combining, by the first party based on additive homomorphic encryption, at least the encrypted first partial projection with the encrypted second partial projection and the encrypted third partial projection to generate an encrypted combined projection; and
sending, by the first party, the encrypted combined projection to at least the second party and the third party to enable the encrypted combined projection to be decrypted into plaintext.

16. The non-transitory computer-readable storage medium of claim 15, wherein the request indicates the projection is to be performed based on at least private data at the first party and private data at least at the second party and private data at the third party, wherein the projection estimates demand.

* * * * *